(12) United States Patent
Kawashima et al.

(10) Patent No.: US 7,652,732 B2
(45) Date of Patent: *Jan. 26, 2010

(54) COLOR FILTER SUBSTRATE AND LIQUID CRYSTAL DISPLAY PANEL

(75) Inventors: Tomoya Kawashima, Tokyo-To (JP); Norihisa Moriya, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 316 days.

This patent is subject to a terminal disclaimer.

(21) Appl. No.: 11/355,494

(22) Filed: Feb. 16, 2006

(65) Prior Publication Data

US 2006/0181659 A1 Aug. 17, 2006

(30) Foreign Application Priority Data

Feb. 17, 2005 (JP) ............................. 2005-040000

(51) Int. Cl.
*G02F 1/1335* (2006.01)
*G02F 1/1333* (2006.01)
*G02F 1/1339* (2006.01)

(52) U.S. Cl. ...................... 349/106; 349/60; 349/97; 349/104; 349/110; 349/117; 349/118; 349/119; 349/120; 349/121; 349/153; 349/190

(58) Field of Classification Search ................ 349/60, 349/97, 104, 106, 117–121, 153, 181, 190
See application file for complete search history.

(56) References Cited

U.S. PATENT DOCUMENTS

| 5,889,569 | A | * | 3/1999 | Okamoto et al. | 349/110 |
|---|---|---|---|---|---|
| 5,953,091 | A | * | 9/1999 | Jones et al. | 349/129 |
| 6,943,863 | B2 | * | 9/2005 | Fujioka et al. | 349/153 |
| 7,230,669 | B1 | * | 6/2007 | Tashiro et al. | 349/153 |
| 7,336,333 | B2 | * | 2/2008 | Song | 349/153 |
| 2001/0010574 | A1 | * | 8/2001 | Hiroshi | 349/141 |
| 2003/0122998 | A1 | * | 7/2003 | Iijima et al. | 349/106 |
| 2004/0057000 | A1 | * | 3/2004 | Hong | 349/117 |
| 2004/0227894 | A1 | * | 11/2004 | Kim et al. | 349/145 |
| 2005/0142464 | A1 | * | 6/2005 | Moriya | 430/7 |
| 2005/0225700 | A1 | * | 10/2005 | Takizawa | 349/106 |
| 2006/0164580 | A1 | * | 7/2006 | Ueda et al. | 349/117 |
| 2007/0182885 | A1 | * | 8/2007 | Egi et al. | 349/96 |

* cited by examiner

*Primary Examiner*—Brian M. Healy
*Assistant Examiner*—Hung Lam
(74) *Attorney, Agent, or Firm*—Burr & Brown (57) ABSTRACT

There are provided a substrate which has solved an unsatisfactory adhesion problem of a seal part in a liquid crystal cell comprising a retardation layer provided on the inner side of the cell, and a liquid crystal cell using the substrate. A black matrix layer 12 formed of a metal and its picture frame part 12A, a color filter layer 13, and a retardation layer 14 are stacked on a substrate 11, and an area including at least the picture frame part 12A is an area to be sealed.

7 Claims, 3 Drawing Sheets

COLOR FILTER SUBSTRATE AND LIQUID CRYSTAL DISPLAY PANEL

BACKGROUND OF THE INVENTION

1. Field of the Invention

The present invention relates to a color filter substrate, and a liquid crystal display panel comprising the color filter substrate stacked on a counter substrate through a seal material.

2. Background Art

A retardation film for controlling a phase difference has hitherto been used in liquid crystal displays. For example, in the reflection-type liquid crystal display, in general, a linearly polarizing plate and a ¼λ retardation plate are used in combination to provide circularly polarized light. Further, in recent years, in a liquid crystal display of a homeotropic alignment mode widely used in liquid crystal TV applications, in order to reduce the dependency of display upon the angle of visibility, a retardation film having an optical axis perpendicular to the substrate and having a negative birefringence anisotropy (a negative C plate) and a retardation film having an optical axis horizontal to the substrate and having a positive birefringence anisotropy (a positive A plate) are used in combination. Many other retardation films are commercially available including view angle compensation films using discotic liquid crystals.

All the above conventional retardation films are applied to the outer side of the liquid crystal cell. In this case, for the reason that different retardation films, or a retardation film and a polarizing plate are applied to each other at a certain specific angle and for the reason that the refractive index of a pressure-sensitive adhesive for application is different from the refractive index of the retardation plate and the refractive index of the polarizing plate, external light reflection occurs at the lamination interface, leading to lowered display contrast.

In recent years, an attempt has been made to provide a retardation layer utilizing a liquid crystal material within a liquid crystal cell (Japanese Patent Laid-Open No. 48627/1998). Such liquid crystal materials usable herein include, for example, liquid crystalline polymers having a glass transition point and capable of freezing the liquid crystal structure at or below the glass transition temperature, and liquid crystalline monomers which can cause three-dimensional crosslinking in a liquid crystal layer state utilizing a reactive group such as an unsaturated bond in a molecular structure and consequently can freeze the liquid crystal structure. The liquid crystal materials can be applied by coating onto a base material having an aligning function. The retardation layer provided within the liquid crystal cell can eliminate the drawbacks of conventional retardation films of a type applied to the outside of the liquid crystal cell.

When a retardation layer is provided on the inner side of the liquid crystal cell, the retardation layer is provided on any one of a pair of substrates constituting the liquid crystal cell. Typically, the retardation layer is provided on the inner side of a color filter substrate with a color filter. The liquid crystal cell is constructed so that a color filter substrate and a counter substrate are provided in combination and a liquid crystal material is filled into between the substrates. Both the substrates face each other while providing a given space therebetween, and the peripheral part of the substrates are sealed with a seal material.

When a retardation film is provided on the outer side of the liquid crystal cell as in the prior art, both the substrates on their inner sides (liquid crystal material filling sides) are intimately contacted with each other through a seal material. When a retardation film is provided on the inner side of the liquid crystal cell, however, for the retardation layer and the seal material, mutual positional relationship and mutual adhesion should be taken into consideration.

For example, in a color filter substrate, in fact, a black matrix layer is sometimes provided on the peripheral part of the display area for displaying an image. The reason why the black matrix layer is formed in a picture frame form is attributable to the production process, that is, is that, in the formation of a black matrix layer using a black pigment-containing resin composition or a thin film of a black metal such as chromium, the black layer is first provided on the whole area of the substrate followed by the removal of the black layer only in its part corresponding to the display part for patterning. This picture frame part functions to prevent light leakage. When a seal material is located in the black matrix layer in its picture frame parts the adhesion between the substrate and the black matrix layer, the adhesion between the black matrix layer and the retardation layer, and the adhesion between the retardation layer and the seal material should be well ensured.

SUMMARY OF THE INVENTION

The present inventors have found that, in forming a black matrix layer in a picture frame form around the display area, when the black matrix layer is formed of a metal, the adhesion between the black matrix layer and the seal material or the retardation layer can be improved. The present invention has been made based on such finding.

Accordingly, an object of the present invention is to provide a substrate which has solved an unsatisfactory adhesion problem of a seal part in a liquid crystal cell comprising a retardation layer provided on the inner side of the cell, and a liquid crystal cell using the substrate.

According to the present invention, there is provided a color filter substrate comprising: a substrate; and at least a black matrix layer, a color filter layer, and a retardation layer stacked on the substrate, wherein the black matrix layer is formed of a metal and comprises a display part having an opening part for displaying an image and an opening part-free picture frame part provided on the periphery of the display part, the color filter layer is stacked only on the display part which is the black matrix layer in its part from which the picture frame part has been excluded, and the black matrix layer in its area excluding the display part and including at least the picture frame part is an area to be sealed.

In a preferred embodiment of the present invention, the black matrix layer, the color filter layer, and the retardation layer are stacked in that order on the substrate.

In another preferred embodiment of the present invention, the black matrix layer, the retardation layer, and the color filter layer are stacked in that order on the substrate.

In a preferred embodiment of the present invention, the area to be sealed includes an area where the picture frame part is stacked.

In another preferred embodiment of the present invention, the area to be sealed is an area where the picture frame part is stacked.

In still another preferred embodiment of the present invention, the area to be sealed is an area where the retardation layer is not stacked.

In a further preferred embodiment of the present invention, the area to be sealed is an area including the retardation layer-stacked area.

In another preferred embodiment of the present invention, the area to be sealed is an area where the retardation layer is stacked.

According to the present invention, there is provided a liquid crystal display panel comprising a color filter substrate and a counter substrate stacked on top of each other through a seal material; and a liquid crystal hermetically filled into between both the substrates, wherein the color filter substrate is the above color filter substrate, and the seal material is provided on an area to be sealed in the color filter substrate.

According to the present invention, in a black matrix layer formed of a metal, since a picture frame part is provided on the periphery of the display part, the counter substrate is stacked so that at least a part of the seal part is in intimate contact with the picture frame part. Therefore, unlike the case where a black matrix layer free from a picture frame part formed of a metal is provided, a color filter substrate, which can solve an unsatisfactory adhesion problem of the seal part, can be realized. Further, since the color filter substrate is constructed so that a part of the seal part is in intimate contact with the picture frame part, the adhesion of the seal part can be improved regardless of the interposition of the retardation layer.

DETAILED DESCRIPTION OF THE INVENTION

Figure 1:
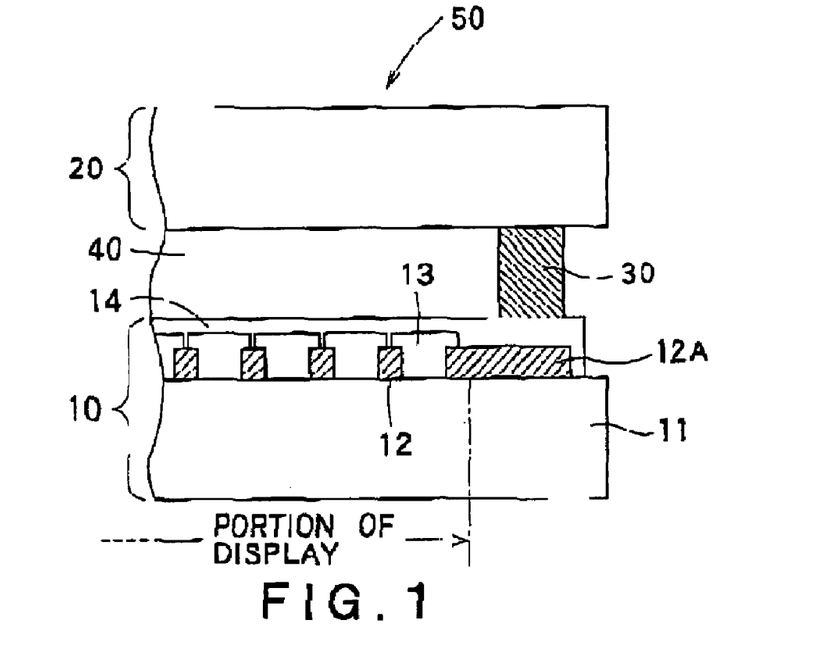
FIG. 1 is a diagram showing an example of a liquid crystal display panel and a color filter substrate.

FIG. 1 is a typical diagram showing a sectional structure of a color filter substrate and a liquid crystal display panel in a preferred embodiment of the present invention.

As shown in FIG. 1, a liquid crystal display panel 50 includes a color filter substrate 10 and a counter substrate 20 stacked on top of each other through a seal material 30 provided on the peripheral part of both the substrates, and a liquid crystal 40 is hermetically filled and sealed in the inner side of both the substrates. The color filter substrate 10 comprises a black matrix layer 12, a color filter layer 13, and a retardation layer 14 stacked in that order on a substrate 11.

The black matrix layer 12 is formed of a metal, for example, a metallic thin film and has, for example, a black color having low light reflectance. In the position corresponding to the image display part in the liquid crystal display panel 50, the black matrix layer 12 comprises a part which has been patterned so that openings are arranged (hereinafter referred to as "display part"), and an opening-free peripheral part (hereinafter referred to as "picture frame part" which is provided around the display part and is formed of the same material as the display part. In the construction of the liquid crystal display panel 50, in general, for examples a transparent electrode layer and an aligning film are further stacked on the color filter substrate 10 side, and, for example, TFT and an aligning film are stacked on the substrate on the counter substrate side. For both the substrates, for example, a terminal for externally supplying electric power should be provided.

Figure 2:
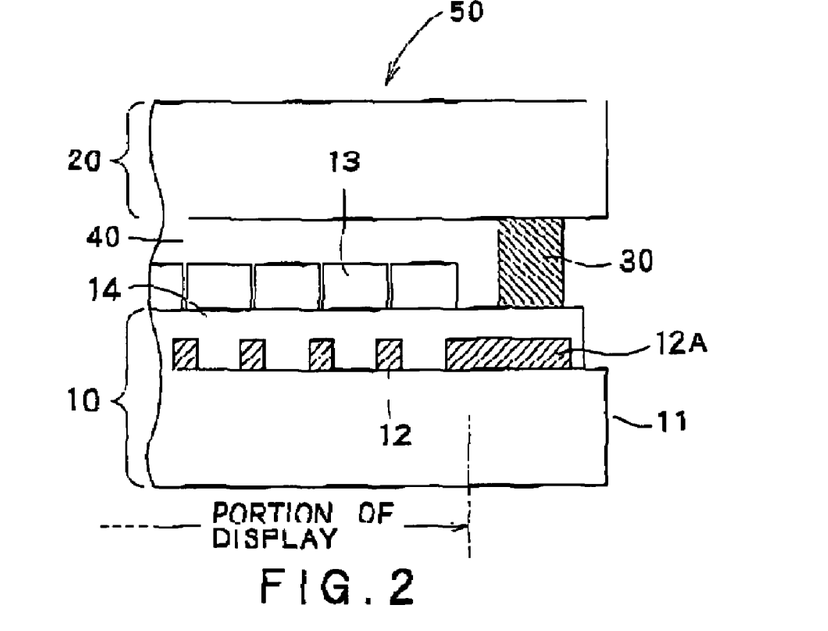
FIG. 2 is a diagram showing another example of a liquid crystal display panel and a color filter substrate.

FIG. 2 is a typical sectional structure of a color filter substrate and a liquid crystal display panel in another embodiment of the present invention.

The sectional structure shown in FIG. 2 is different from the sectional structure shown in FIG. 1 in the stacking position of the color filter layer 13. Specifically, in the construction shown in FIG. 2, a retardation layer 14 is first stacked on a black matrix layer 12, and a color filter layer 13 is stacked on the retardation layer 14. The other members are the same as those described above in connection with FIG. 1. Even when the order of stacking of the color filter layer 13 and the retardation layer 14 is changed, there is no difference in function of both the layers as the liquid crystal display panel and, thus, these layers may be stacked in any order.

In the liquid crystal display panel 50, two or more colors, generally three colors or four colors, are displayed. To this end, fine areas for respective predetermined colors are provided in the color filter layer 13. For example, fine areas for respective colors of red (R), green (G), and blue (B) are regularly arranged vertically and horizontally, for example, in the order of R, G, B, R, G, B, . . . to form an assembly. The black matrix layer 12 functions to partition fine areas for respective colors consulting the color filter layer 13 and, at the same time, functions to prevent leakage of external light from a gap part caused at the boundary of each area, unnecessary reflection and the like. The black matrix layer 12 is formed, for example, in a unidirectional or bidirectional lattice, network, or honeycomb form and is generally black. Although the outer shape of the black matrix layer is not always identical and varies depending upon applications, one example of the outer shape is a lattice form which has a horizontal to vertical ratio of, e.g., 3:4 or 9:16.

The black matrix layer 12 and the color filter layer 13 are stacked on a substrate which is somewhat larger than the size (display size) of a part (display part) which generally actually participates in the display. In this case, the black matrix layer 12 and the color filter layer 13 are stacked so that a margin is provided on the periphery of the substrate. The seal part on which the seal material is provided is set on the outer side of the display part so as not to hinder the display. For sealing under given conditions and for improving the adhesion of the seal part, as described above, the black matrix layer 12 formed of a metal in its peripheral part (picture frame part) free from any opening is provided outside the display part.

As with the black matrix layer 12 and the color filter layer 13, the provision of a retardation layer 14 only in the display part suffices for satisfactory function. Since, however, the retardation layer 14 and the seal material 30 have good adhesion to each other, the retardation layer 14 is preferably provided so as to cover an area to be sealed. In order to stack the retardation layer 14 only in a specific area for stacking while providing a margin around the substrate, any patterning means is necessary. In general, after the formation of the retardation layer on the whole area of the substrate 11, the unnecessary part is removed by pattern-wise exposure and development. From the viewpoint of forming the retardation layer 14, preferably, the retardation layer is stacked on the whole area of the substrate 11. In FIGS. 1 and 2, the retardation layer 14 is extended to a position outside the peripheral part of the color filter layer 13 and is provided somewhat wider than the picture frame part 12A-provided part in the black matrix layer. The seal material 30 is stacked in an area where the picture frame part 12A in the black matrix layer is present, the color filter layer 13 is absent, and the picture frame part 12A is covered by the retardation layer 14. However, the following other embodiments may also be adopted.

FIGS. 3 to 6 each are a diagram showing a positional relationship of the layers constituting the color filter substrate 10 and the color filter substrate 10 in a liquid crystal display panel. In particular, FIGS. 3 to 6 show various embodiments in which the positional relationship of the picture frame part 12A in the black matrix layer, the retardation layer 14 and the seal material 30 relative to the substrate 11 is different. All of FIGS. 3 to 6 are enlarged typical views of an upper right corner part. In the liquid crystal display panel when the liquid crystal display panel is observed from the counter substrate side. For convenience, such a state that the counter substrate 20 has been removed from the liquid crystal display panel 50 shown in FIGS. 1 and 2 is shown.

Figure 3:
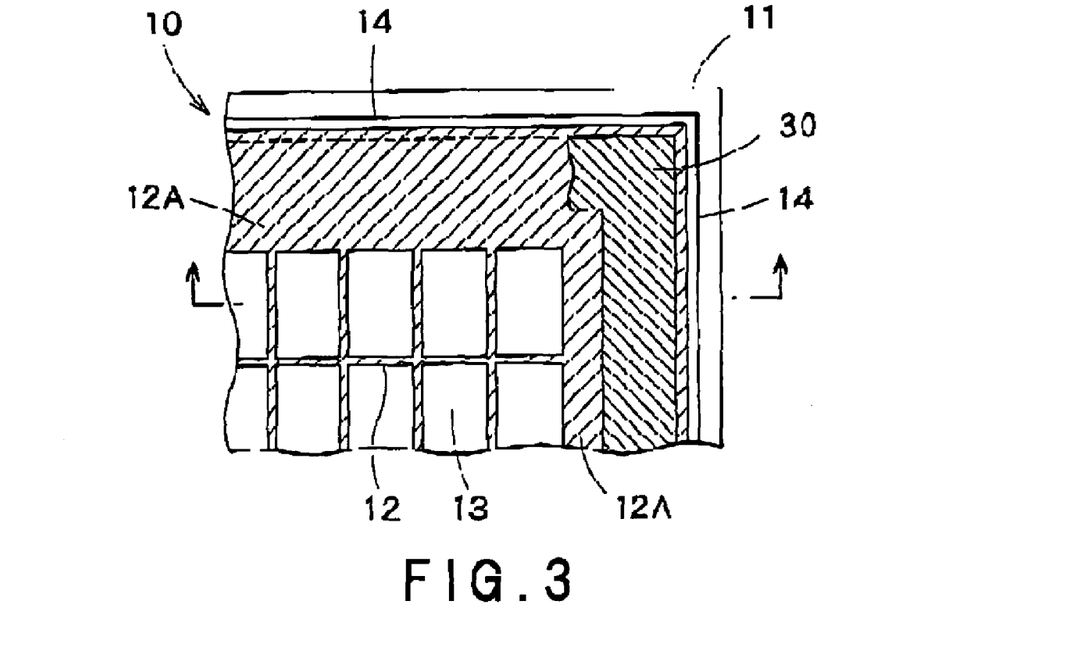
FIG. 3 is a diagram showing such a state that a seal material is stacked on a picture frame part and a retardation layer.

In the embodiment shown in FIG. 3, a color filter layer 13 comprising assembled voids representing individual fine areas, and a black matrix layer 12 (shown as a thick hatched part) for partitioning individual fine areas in the color filter layer 13 are stacked on the substrate 11. Further, the black matrix layer 12 has a picture frame part 12A which is a part extended to a part around the black matrix layer 12 and is free from any opening. The picture frame part 12A is stacked on the substrate 11 so as to provide a margin around the substrate 11. In this embodiment, the color filter layer is provided only on the display part. The retardation layer 14 is stacked so as to cover the black matrix layer 12 and the color filter layer 13 and to be somewhat wider than the picture frame part 12A in the black matrix layer and to provide a narrow width margin around the substrate 11. The picture frame part 12A or/and the retardation layer 14 may be extended to the end of the substrate (that is, so as not to provide any margin). In particular, when the retardation layer 14 is extended to the end around the substrate, unlike the black matrix layer 12, there is no need to conduct patterning. Therefore, this embodiment is suitable for the formation of a retardation layer by a method which cannot regulate the application range, for example, by spin coating.

In the embodiment shown in FIG. 3, the seal material 30 is stacked on an area where the black matrix layer in its picture frame part 12A and the retardation layer 14 are provided. In FIG. 3, the section in a line provided with an arrow in its both ends corresponds to the section of the part of the color filter substrate 10 and the seal material 30 in the liquid crystal display panel 50 shown in FIG. 1. Accordingly, in the embodiment shown in FIG. 3, the layer construction of the assembly in its part where the seal material 30 is provided is such that the substrate 11, the picture frame part 12A, the retardation layer 14, and the seal material 30 are stacked in that order. Since the adhesion between the substrate 11 and the picture frame part 12A formed of a metallic thin film is better than the adhesion between the substrate 11 and the retardation layer 14, no adhesion problem occurs. Further, there is no problem of the adhesion between the retardation layer 14 and the seal material.

Figure 4:
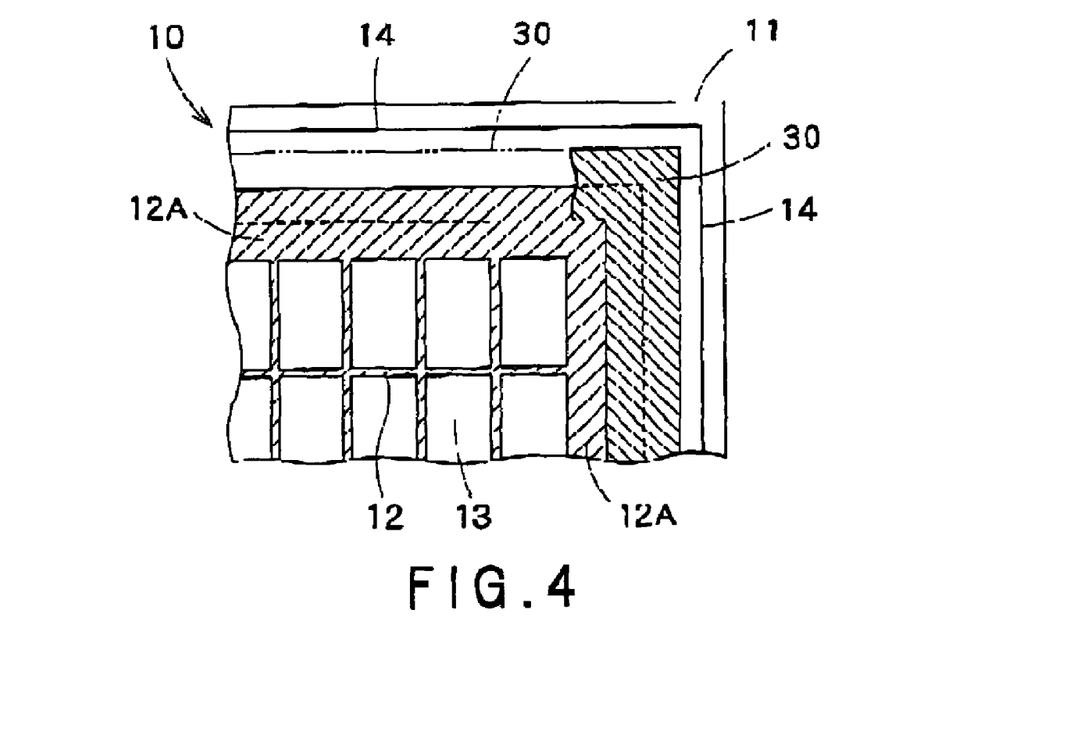
FIG. 4 is a diagram showing such a state that a seal material is stacked on a picture frame part, a picture frame part-free part, and a retardation layer.

In the embodiment shown in FIG. 4, as compared with the liquid crystal display panel in the embodiment shown in FIG. 3, the area occupied by the picture frame part 12A or/and the retardation layer 14 is smaller.

In the embodiment shown in FIG. 4, the retardation layer 14 is formed on the same position as the position in the embodiment shown in FIG. 3. In FIG. 4, however, the black matrix layer is stacked so that the peripheral part of the picture frame part 12A in the black matrix layer is formed in a more inward part. The peripheral part of the picture frame part 12A in the black matrix layer is located substantially at the center of the width of the seal material. As a result, the seal material 30 is located at a position which lies across the picture frame part 12A-provided area and the picture frame part 12A-free part in the black matrix layer.

Accordingly, in the embodiment shown in FIG. 4, the layer construction of the assembly in its part where the seal material 30 is provided, comprises a part where the substrate 11, the picture frame part 12A, the retardation layer 14, and the seal material 30 are stacked in that order, and a part where the substrate 11, the retardation layer 14, and the seal material 30 are stacked in that order. Therefore, as compared with the embodiment shown in FIG. 3, the adhesion improvement effect attained by the picture frame part 12A formed of a metallic thin film is substantially halved. However, in the whole liquid crystal display panel, the adhesion between the seal material 30 and the retardation layer 14 and the substrate 11 is improved. Preferably not less than 20%, more preferably not less than 50%, of the seal material 30-stacked part is accounted for by the area of the picture frame part 12A from the viewpoint of improving the adhesion.

Figure 5:
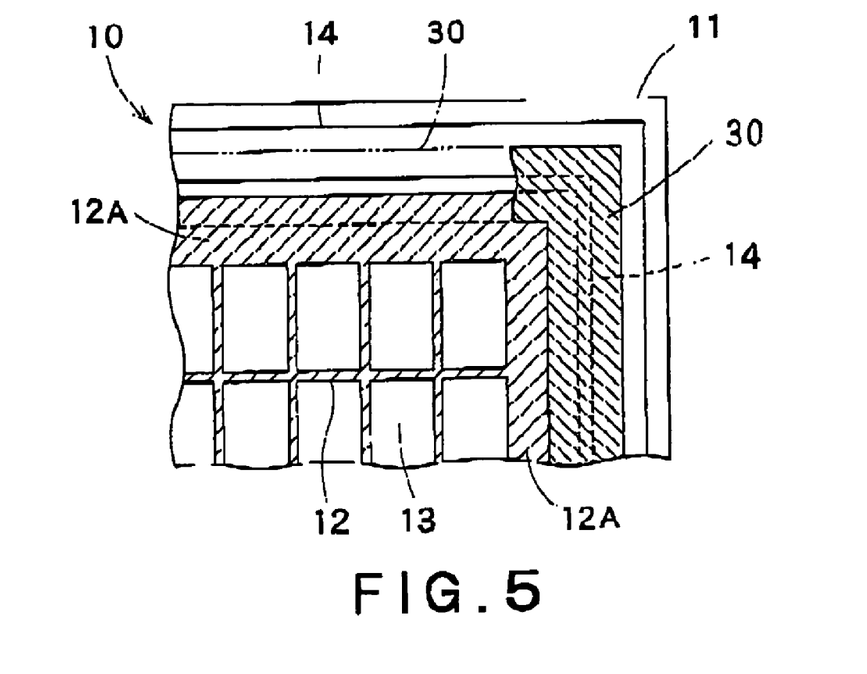
FIG. 5 is a diagram showing such a state that a seal material is stacked on a part where a picture frame part and a retardation layer are present, and a part where a picture frame part and a retardation layer are absent.

In the embodiment shown in FIG. 5, the picture frame part 12A is formed at the same position as in the embodiment shown in FIG. 4. In the embodiment shown in FIG. 5, however, the retardation layer 14 is formed so as to be somewhat wider than the picture frame part 12A. In FIG. 5, the peripheral part of the retardation layer 14 is somewhat outside the peripheral part of the picture frame part 12A. Alternatively, the peripheral part of the retardation layer 14 may overlap with the peripheral part of the picture frame part 12A. Further, the peripheral part of the retardation layer 14 may be located a slightly inward position from the peripheral part of the picture frame part 12A.

In the embodiment shown in FIG. 5, when the peripheral part of the picture frame part 12A conforms to the peripheral part of the retardation layer 14 (that is, both have the some size), the layer construction of the assembly in its part where the seal material 30 is provided, comprises a part where the substrate 11, the picture frame part 12A, the retardation layer 14, and the seal material 30 are stacked in that or4der, and a part where the substrate 11 and the seal material 30 are stacked in that order. In the former case, since the picture frame part 12A and the retardation layer 14 are interposed between the base material 11 and the seal material 30, the adhesion can be ensured. On the other hand, in the latter case, since the adhesion between the substrate 11 and the seal material 30 is good, the whole seal part has good adhesion. In this case, the adhesion in the seal part is better than that in the embodiment shown in FIG. 4.

Figure 6:
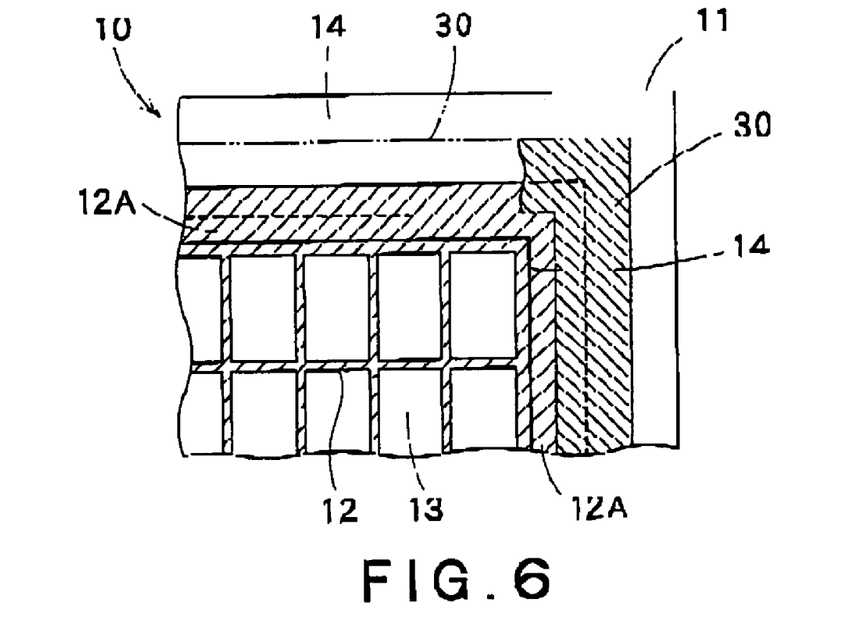
FIG. 6 is a diagram showing such a state that a seal material is stacked on a picture frame part and on a part which is free from the picture frame part and is free from a retardation layer.

In the embodiment shown in FIG. 6, the picture frame part 12A is formed at the same position as in the embodiment shown in FIG. 5. In the embodiment shown in FIG. 6, however, the retardation layer 14 is formed in such a size that it covers the black matrix layer 12 and does not substantially cover the picture frame part 12A. In this case, as compared with the embodiment shown in FIG. 5, the area is further reduced.

In the embodiment shown in FIG. 6, the layer construction of the assembly in its part where the seal material 30 comprises a part where the substrate 11, the picture frame part 12A, and the seal material 30 are stacked in that order, and a part where the substrate 11 and the seal material 30 are stacked in that order. In any part, there is no problem of the adhesion between the layers, and, as compared with the embodiment shown in FIG. 5, the adhesion is better.

Each member constituting the color filter substrate according to the present invention will be described.

(1) Substrate

The substrate 11 is preferably formed of an inorganic base material such as glass, silicon, or quartz. The substrate 11 may also be formed of the following organic base material, examples of organic base materials include acrylic materials such as polymethyl methacrylate, polyamide, polyacetal, polybutylene terephthalate, polyethylene terephthalate, polyethylene naphthalate, triacetylcellulose, or syndiotactic polystyrene or the like, polyphenylene sulfide, polyether ketone, polyether ether ketone, fluororesin or polyethernitrile or the like, polycarbonate, modified polyphenylene ether, polycyclohexene or polynorbornene resin or the like, or polysufone, polyether sulfone, polyallylate, polyimide-imide, ployetherimide or thermoplastic polyimide. Further, conventional plastics may also be used as the organic base material. The thickness of the substrate is not particularly limited. For example, a thickness in the range of about 5 μm to several millimeters may be adopted dependent upon applications.

(2) Black Matrix Layer

The black matrix layer 12 is a metal black matrix (called "Cr black matrix" because it is typically formed of Cr).

The metal black matrix may be formed by a method in which, for example, a thin film of a metal, a metal oxide, or a metal nitride is formed by various methods such as vapor deposition, ion plating, or sputtering followed by patterning utilizing photolithography, or an electroless plating method. Specific examples thereof include a two-layer chromium black matrix having a laminate structure of CrOx/Cr, wherein x is any number and "/" represents stacking, or a three-layer chromium black matrix having a laminate structure of CrOx/CrNy/Cr, wherein x and y are any number, having further lowered reflectance. The thickness of the metal black matrix is about 0.2 μm to 0.4 μm.

(3) Color Filter Layer

The fine areas for respective colors constituting the color filter layer 13 may be formed in each opening of the black matrix layer 12. However, for convenience, the fine areas may be formed in a strip form. The color filter layer is formed from a resin composition containing a colorant dissolved or dispersed therein, preferably containing a fine pigment dispersed therein. The color filter layer may be formed by preparing an ink composition which has been colored in a predetermined color, and conducting printing for each color pattern. More preferably, however, the color filter layer is formed by photolithography using a coating material-type photosensitive resin composition containing a colorant of a predetermined color. The thickness of the color filter layer is about 1 μm to 5 μm.

(4) Retardation Layer

The retardation layer 14 is formed of a liquid crystal material which has been solidified while retaining the aligned state. The retardation layer 14 may have a single layer structure or two or more layer structure according to need. The liquid crystal material for constituting the retardation layer may be a liquid crystal material having positive birefringence anisotropy or a liquid crystal material having negative birefringence anisotropy. A nematic liquid crystal having a rod-like structure may be mentioned as a liquid crystal material having positive birefringence anisotropy, and a discotic liquid crystal having a disc structure may be mentioned as a liquid crystal material having negative birefringence anisotropy. These liquid crystal materials include liquid crystal monomers, liquid crystal oligomers, or liquid crystal polymers. From the viewpoint of curing while retaining the aligned state, preferred are polymerizable liquid crystals, especially polymerizable liquid crystal monomers, which are polymerized and cured upon exposure to ionizing radiations such as ultraviolet light and electron beams.

Since the retardation level and the alignment properties are determined by the birefringence an of liquid crystal molecules and the thickness of the retardation layer, Δn is preferably about 0.03 to 0.15. The chiral agent mixed into the nematic liquid crystal is not particularly limited so far as a desired spiral pitch is induced without sacrificing the liquid crystallinity of the liquid crystal material. Such chiral agents are low molecular compounds having a molecular weight of not more than 1500 and include compounds which have chirality in the molecule thereof and contains one or at least two asymmetric carbon atoms, compounds having an asymmetric point on a heteroatom such as chiral amine or chiral sulfoxi-5-de, or compounds having an axial asymmetrical and optically active site such as cumulene and binaphthol.

Regarding the liquid crystal material and optionally used chiral agent, curing while retaining the aligned state can be realized by preparing an ionizing radiation polymerizable liquid crystal composition containing a chiral agent, a polymerization initiator or the like, for example, in the case of a polymerizable liquid crystal monomer, for example, a photopolymerizable liquid crystal composition, coating the composition onto an object face, subjecting the coating to alignment treatment, and further exposing the treated coating an ionizing radiation (for example, exposure to ultraviolet light).

The polymerizable liquid crystal monomer may be one, for example, disclosed in Published Japanese translation of PCT Publication No. 508882/1998, and the polymerizable chiral agent may be one, for example, disclosed in Japanese Patent Laid-Open No. 258638-1995.

Specifically, compounds represented by formulae (1) to (11) may be used as the polymerizable liquid crystal monomer, and compounds represented by formulae (12) to (14) are suitable at the polymerizable chiral agent.

(1)

(2)

In formulae (11) to (14), a to e representing the number of methylene groups (chain length of alkylene group) each are an integer and are 2 to 5. a and b are each independently an integer of 2 to 12, more preferably 4 to 10, particularly preferably 6 to 9. c and d are each 2 to 12, more preferably 4 to 10, particularly preferably 6 to 9.

The retardation layer may be formed by providing the above ionizing radiation polymerizable liquid crystal composition, for example, the photopolymerizable liquid crystal composition, optionally dissolving the composition in a solvent or diluting the composition with a solvent, properly coating the composition by spin coating, die coating, slit coating, or other method, raising the temperature to a temperature at which a liquid crystal phase is developed to align the liquid crystal, and then applying an ionizing radiation (for example, ultraviolet light) for polymerization.

A silane coupling agent may be incorporated in the composition for retardation layer formation. The silane coupling agent preferably contains a hydrophilic functional group such as amine. Further, from the viewpoint of preparing a composition for retardation layer formation, the silane coupling agent is preferably soluble in an organic solvent. Specifically, the silane coupling agent may be one or at least two compounds selected from compounds which will be described below. The mixing amount is on such a level that will not sacrifice the alignment of the liquid crystal, that is, about 0.001% to 10% (on a mass basis), more preferably about 0.01 to 5%, based on the liquid crystal material.

Specific examples of silane coupling agents include N-2-(aminoethyl)-3-aminopropylmethyldimethoxysilane (Shin-Etsu Silicone "KBM-602" manufactured by The Shin-Etsu Chemical Co., Ltd.), N 2-(aminoethyl)-3-aminopropyltrimethoxysilane (Shin-Etsu Silicone "KBM-603" manufactured by The Shin-Etsu Chemical Co., Ltd.), 3-aminopropyltrimethoxysilane (Shin-Etsu Silicone "KBM-903" manufactured by The Shin-Etsu Chemical Co., Ltd.), γ-aminopropyltriethoxysilane ("TSL-8331", manufactured by GE Toshiba Silicone Co., Ltd.), N-(β-aminoethyl)-γ-aminopropyltrimethoxysilane "-TSL-8340" manufactured by GE Toshiba Silicone Co., Ltd.), N-(β-aminoethyl)-γ-aminopropylmethyldimethoxysilane ("TSL-8345" manufactured by GE Toshiba Silicone Co., Ltd.), γ-(2-aminoethyl)-aminopropyltrimethoxysilane ("SH-6020", manufactured by Dow Corning), and γ-(2-aminoethyl)-aminopropylmethyldimethoxysilane ("SH-6023", manufactured by Dow Corning).

Further, preferably, a photopolymerization initiator is added in the composition for retardation layer formation in such an amount that does not sacrifice the alignment of the liquid crystal. The addition of a radical polymerization initiator capable of generating free radicals upon exposure to ultraviolet light energy is preferred. The addition amount of the photopolymerization initiator is about 0.01% to 15% (on a mass basis), more preferably about 0.5% to 10%, based on the liquid crystal material.

Specific examples of photopolymerization initiators include benzyl (known also as "bibenzyol"), benzoin isobutyl ether, benzoin isopropyl ether, benzophenone, benzoylbenzoic acid, methyl benzoyl benzoate, 4-benzoyl-4'-methyldiphenyl sulfide, benzyl methyl ketal, dimethylaminomethyl benzoate, 2-n-butoxyethyl-4-dimethylamino benzoate, isoamyl p-dimethylamino benzoate, 3,3'-dimethyl-4-methoxybenzophenone, methylbenzoyl formate, 2-methyl 1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone.

(5) Seal Material

The seal material may be any seal material so far as it is generally used in liquid crystal display panels. For example, a resin seal material comprising a resin material may be used as the seal material. The resin seal material may be one or at least two resins selected, for example, from bisphenol F diglycidyl ethers, bisphenol A diglycidyl ethers, resorcinol diglycidyl ether resins, phenol novolak epoxy resins, or triphenolmethane epoxy resins. Specific examples thereof include a seal material "XN-5A", manufactured by Mitsui Chemicals Inc. This seal material may optionally contain other components. Examples of other components include fine particles such as fine particles of carbon black, resin coated carbon black, iron oxide, titanium oxide, aniline black, and cyanine black, inorganic fillers such as talc and mica, silane coupling agents such as aminosilane and epoxysilane, solvents such as cellosolves and carbitols, and curing accelerators such as imidazoles, triphenylphosphine bicycloundecene, and tris-dimethylaminomethylphenol.

A liquid crystal display panel comprising a color filter substrate and a counter substrate stacked onto each other through a seal material 30 can be prepared by preparing a composition, by incorporating necessary components in the above resin, applying the composition by means such as printing onto a substrate 11 onto a retardation layer 14, or a part which lies across the top of the substrate 11 and the top of the retardation layer 14, optionally drying the coating to such an extent that does not hinder handling, then putting the color filter substrate on top of the counter substrate, pressing the assembly, and curing the composition by curing means such as heating or ultraviolet irradiation. In this case, after the application of the composition for seal material 30 formation onto the counter substrate 20 side, the color filter substrate 10 may be stacked. Alternatively, a method may also be adopted in which the composition is applied onto both the color filter substrate 10 side and the counter substrate 20 side.

EXAMPLES

A melt molded borosilicate thin sheet glass having a thickness of 0.7 mm (manufactured by Corning Incorporated, stock number: 7059) was provided as a substrate and was cleaned. Thereafter, a chromium thin film having a three-layer structure was formed by sputtering on the substrate. Next, a photoresist (LC-100 VL-5 cp, manufactured by Shipley Far East Ltd.) was spin coated onto the thin film. The coating was then prebaked under conditions of temperature 120° C. and heating time 3 min. After the prebaking, the coated face was subjected to alignment exposure at an exposure of 100 mJ/cm$^2$ through a predetermined pattern. After the exposure, spray development was carried out with a developing solution (a 5% diluted solution of IT-DC, manufactured by The Inctec Inc.) for 60 sec, followed by water rinsing for one min to form a resist pattern.

Etching was carried out with an etching solution (IT-ELM, manufactured by The Inctec Inc.) utilizing the formed resist pattern for 3 min, and water rising was then carried out for one min to remove the thin film in its parts not covered with the resist. After the removal, whole image exposure was carried out for 3 min, and spray development was again carried out with a developing solution (5% diluted solution of IT-DC, manufactured by The Inctec Inc.) for 5 min. Thereafter, the resist was separated to form a chromium black matrix having a three-layer structure. In the black matrix layer, a 20 mm-width opening part-free picture frame part is provided on the periphery of the black matrix layer in its part with an opening part (a display part).

Next, a photoresist for red pattern formation was spin coated on the substrate with the black matrix formed thereon, followed by prebaking under conditions of temperature 180° C. and heating time 15 min. Thereafter, alignment exposure was carried out with an ultraviolet light source at an exposure of 300 mJ/cm$^2$ though a predetermined pattern. After the exposure, spray development was carried out with a 0.1% aqueous KOH solution for 60 sec, and post baking was then carried out under conditions of temperature 200° C. and heating time 60 min. Thus, a 2.6 μm-thick red pattern was formed at positions corresponding to predetermined openings of the black matrix. Each of color patterns including the red pattern was formed in an area in the display size range.

Next, a 2.6 μm-thick green pattern was formed in the same manner as in the red pattern formation step, except that a photoresist for green pattern formation was used. Subsequently, a 2.6 μm-thick blue pattern was formed using a photoresist for blue pattern formation. The red, green and blue patterns were formed so as to the arranged in positions corresponding to different openings of the black matrix. Thus, a color filter layer was formed in which three-color patterns, i.e., a red pattern, a green pattern, and a blue pattern were arranged.

In some cases, a transparent protective layer is provided on a color filter layer. In this Example, the provision of the transparent protective layer was omitted.

The photoresists used in the formation of the color filter layer, that is, a photoresist for red pattern formation, a photoresist for green pattern formation, and a photoresist for blue pattern formation, were prepared by mixing a dispersion liquid composition and a clear resist composition together. The dispersion liquid composition was prepared by adding beads to a dispersion composition comprising a pigment, a dispersant, and a solvent, dispersing them in each other with a paint shaker as a disperqator for 3 hr, and removing the beads. The clear resist composition comprised a polymer, a monomer, an additive, an initiator, and a solvent. The photoresists had the following respective compositions (all 'parts' are by mass).

Photoresist for Red Pattern Formation

| | |
|---|---|
| Red pigment (C.I. PR 254) (CROMOPHTAL DPP Red BP, manufactured by Ciba Specialty Chemicals, K.K.) | 3.5 parts |
| Yellow pigment (C.I. PY 139) (Paliotol Yellow D1819, manufactured by BASF) | 0.6 part |
| Dispersant (Solsperse 24000, manufactured by Zeneca Co., Ltd.) | 3.0 parts |
| Polymer 1 (See below) | 5.0 parts |
| Monomer (Polyfunctional acrylate, stock number; SR 399, manufactured by Sartomer) | 4.0 parts |
| Initiator (Irgacure 907, manufactured by Ciba Specialty Chemicals, K.K.) | 1.4 parts |
| Initiator (2,2'-bis(o chlorophenyl)-4,5,4',5'-tetraphenyl-1,2'-biimidazole) | 0.6 part |
| Solvent (propylene glycol monomethyl ether acetate) | 80.0 parts |

Polymer 1 is a polymer prepared by adding 16.9% by mole of 2 methacryloyloxyethyl isocyanate to 100% by mole of a copolymer of benzyl methacrylate:styrene:acrylic acid:2-hydroxyethyl methacrylate=15.6:37.0:30.5:16.9 (molar ratio) and has a weight average molecular weight of 42500. The same shall apply hereinafter.

Photoresist for Green Pattern Formation

A photoresist for green pattern formation was prepared in the same manner as in the photoresist for red pattern formation, except that the following pigments were used according to the following formulation instead of the red and yellow pigments in the photoresist for red pattern formation.

| | |
|---|---|
| Green pigment (C.I. PG 7) (Seikafast Green 5316P, manufactured by Dainichiseika Color & Chemicals Manufacturing Co., Ltd.) | 3.7 parts |
| Yellow pigment (C.I. PY 139) (Paliotol Yellow D1819, manufactured by BASF) | 2.3 parts |

Photoresist for Blue Pattern Formation

A photoresist for blue pattern formation was prepared in the same manner as in the photoresist for red pattern formation, except that the following pigments were used according to the following formulation instead of the red, and yellow pigments and the dispersant in the photoresist for red pattern formation.

| | |
|---|---|
| Blue pigment (C.I. PB 15:6) (Heliogen Blue L 6700F, manufactured by BASF) | 4.6 parts |
| Violet pigment (C.I. PV 23) (Hostaperm RL-NF, manufactured by Clariant) | 1.4 parts |
| Pigment derivative (Solsperse 12000, manufactured by Zeneca Co., Ltd.) | 0.6 part |
| Dispersant (Solsperse 24000, manufactured by Zeneca Co., Ltd.) | 2.4 parts |

After a black matrix and a color filter layer were formed on a substrate, a photosensitive resin composition for C plate formation having the following formulation was spin coated onto the formed layers. After coating, the assembly including the substrate was placed on a hot plate and heated under conditions of temperature 80° C. and heating time 3 min to remove the solvent and to develop a liquid crystal structure in the coating film. Thereafter, the whole area of the coating film was exposed to ultraviolet light with a wavelength of 365 nm at an exposure of 50 J/cm$^2$. After the exposure, the assembly including the substrate was placed on a hot plate of a temperature of 230° C. for 30 min for heating to fully cure the coating film. Thus, a 3.0 μm-thick C plate retardation layer was formed to prepare a color filter substrate.

A color filter substrate (A), in which a black matrix was provided in an area in the display size range, and a comparative color filter substrate (B), in which a black matrix was provided continuously also on the outer side of the display size to provide a display size part and, further, a 20 mm-width full-density blotted layer part, were prepared. In both the color filter substrates (A) and (B), the retardation layer was formed so as to extend to the end of the substrate.

Photosensitive Resin Composition for C Plate Formation

| | |
|---|---|
| Polymerizable liquid crystal monomer (which exhibits nematic liquid crystal phase represented by formula (11)) | 22 parts |
| Polymerizable chiral agent (represented by formula (14)) | 1.8 parts |

-continued

| | |
|---|---|
| Photopolymerization initiator (Irgacure 907, manufactured by Ciba Specialty Chemicals, K.K.) | 1.3 parts |
| Amine silane coupling agent (TSL-8331, manufactured by GE Toshiba Silicone Co., Ltd.) | 0.05 part |
| Solvent (chlorobenzene) | 75 parts |

Evaluation of Adhesion of Retardation Layer

In the color filter substrate thus obtained, the adhesion between the retardation layer and the layer underlying the retardation layer was evaluated. For the sample (A) in which the black matrix was provided in an area in the display size range, the stacked part of substrate/retardation layer on the outer side of the display size was evaluated. For the sample (B) in which the black matrix was provided on the outer side of the display size and a 20 mm-width full-density layer part was provided on the outer side of the display size, the stacked part of substrate/picture frame layer/retardation layer on the outer side of the display size was evaluated.

The adhesion was evaluated as follows. Eleven parallel linear cut flaws were formed on the surface of the retardation layer at intervals of 1 mm with a cutter knife. Subsequently, in a right-angled direction, eleven parallel linear cut flaw were formed at intervals of 1 mm in the same manner as described above. Thus, cut flaws in a network form which were 1 mm in both intervals of the vertical cut flaws and intervals of the horizontal cut flaws, were formed onto the surface of the retardation layer.

A pressure-sensitive adhesive tape (Mending tape #810, width 18 mm, manufactured by Sumitomo 3M Ltd.) was applied to the formed network part. Thereafter, the pressure-sensitive adhesive tape was pulled at a constant speed in a right-angled direction to separate the tape, and the state of the surface of the retardation layer was observed under a microscope (magnification: 50 times).

The evaluation results show that, for sample (A), the separation of the retardation layer from the cut flaw part was hardly observed. On the other hand, for sample (B), in some sites, separation of the retardation layer from the cut flaw part was observed. These results demonstrate that the interposition of a picture frame layer in a metal black matrix improves the adhesion of the retardation layer.

What is claimed is:

1. A color filter substrate comprising:
a substrate having a first surface and an opposed second surface, and at least a black matrix layer, a color filter layer, and a retardation layer stacked on the first surface of the substrate,
wherein the black matrix layer is formed of a metal and comprises (i) a display part, which has been patterned to form opening parts for displaying an image, and (ii) a frame part, which has not been patterned, provided on the periphery of the display part,
wherein the color filter layer is stacked only on the display part of the black matrix layer,
wherein the color filter substrate is used for a liquid crystal display panel which comprises the color filter substrate and a counter substrate stacked on top of each other through a seal material and a liquid crystal hermetically sealed therebetween;
wherein the retardation layer is located between the first surface of the substrate and the counter substrate in the liquid crystal display panel;
wherein an area of the black matrix layer that includes at least the frame part, but not the display part, is an area to be sealed, and
wherein the seal material is provided on at least part of the retardation layer and does not contact the black matrix layer or the color filter layer.

2. The color filter substrate according to claim 1, wherein the black matrix layer, the color filter layer, and the retardation layer are stacked in that order on the substrate.

3. The color filter substrate according to claim 1, wherein the black matrix layer, the retardation layer, and the color filter layer are stacked in that order on the substrate.

4. The color filter substrate according to claim 1, wherein the area to be sealed includes an area where the frame part is stacked.

5. The color filter substrate according to claim 1, wherein the area to be sealed is an area where the frame part is stacked.

6. The color filter substrate according to claim 1, wherein the area to be sealed is an area where the retardation layer is stacked.

7. A liquid crystal display panel comprising:
the color filter substrate to claim 1.

* * * * *

UNITED STATES PATENT AND TRADEMARK OFFICE
CERTIFICATE OF CORRECTION

| | |
|---|---|
| PATENT NO. | : 7,652,732 B2 |
| APPLICATION NO. | : 11/355494 |
| DATED | : January 26, 2010 |
| INVENTOR(S) | : Kawashima et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Twenty-eighth Day of December, 2010

David J. Kappos
*Director of the United States Patent and Trademark Office*